United States Patent
Jeganathan et al.

(10) Patent No.: US 9,860,162 B2
(45) Date of Patent: Jan. 2, 2018

(54) SECURING INTER-AUTONOMOUS SYSTEM LINKS

(71) Applicant: Juniper Networks, Inc., Sunnyvale, CA (US)

(72) Inventors: Jeyananth Minto Jeganathan, Pleasanton, CA (US); Kaliraj Vairavakkalai, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 93 days.

(21) Appl. No.: 14/871,044

(22) Filed: Sep. 30, 2015

(65) Prior Publication Data

US 2017/0093701 A1 Mar. 30, 2017

(51) Int. Cl.
| | | |
|---|---|---|
| *H04L 12/723* | (2013.01) | |
| *H04L 12/46* | (2006.01) | |
| *H04L 12/741* | (2013.01) | |
| *H04L 12/715* | (2013.01) | |
| *H04L 12/935* | (2013.01) | |
| *H04L 12/931* | (2013.01) | |

(52) U.S. Cl.
CPC .......... *H04L 45/50* (2013.01); *H04L 12/4641* (2013.01); *H04L 45/04* (2013.01); *H04L 45/502* (2013.01); *H04L 45/54* (2013.01); *H04L 45/745* (2013.01); *H04L 49/3009* (2013.01); *H04L 49/602* (2013.01)

(58) Field of Classification Search
CPC ... H04L 49/3009; H04L 45/586; H04L 49/70; H04L 45/00; H04L 45/02; H04L 45/04; H04L 45/68
See application file for complete search history.

(56) References Cited

U.S. PATENT DOCUMENTS

| | | |
|---|---|---|
| 8,125,926 B1 | 2/2012 | Kompella |
| 9,019,962 B1 | 4/2015 | Ghosh |
| 2009/0201934 A1* | 8/2009 | Rijsman .............. H04L 63/1466 370/395.31 |

(Continued)

OTHER PUBLICATIONS

Extended European Search Report from counterpart European Application No. 16190810.8, dated Feb. 9, 2017, 10 pp.

(Continued)

*Primary Examiner* — Charles C Jiang
*Assistant Examiner* — Kyaw Z Soe
(74) *Attorney, Agent, or Firm* — Shumaker & Sieffert, P.A.

(57) ABSTRACT

In one example, an autonomous system boundary router (ASBR) forms part of a first autonomous system (AS). The ASBR is between a first provider edge (PE) router of the first AS and a second PE router of a second, different AS. The first PE router and the second PE router form a Multiprotocol Label Switching (MPLS) path. The ASBR includes an interface communicatively coupled to a routing device external to the first AS, a memory configured to store a forwarding table associated with the interface, and one or more processing units configured to receive a packet via the interface, determine that the packet is encapsulated by an MPLS label, select a forwarding table based on the interface by which the packet was received, and forward the packet according to forwarding information of the forwarding table when the forwarding table includes the MPLS label.

22 Claims, 4 Drawing Sheets

(56) References Cited

U.S. PATENT DOCUMENTS

2009/0210193 A1     8/2009  Nagase
2010/0061230 A1*    3/2010  Xiong .................... H04L 45/02
                                                              370/225
2010/0284409 A1*   11/2010  LV ...................... H04L 12/4675
                                                           370/395.31

OTHER PUBLICATIONS

Andersson et al., "Provider Provisioned Virtual Private Network (VPN) Terminology," RFC 4026, Network Working Group, Mar. 2005, 19 pp.

Rosen et al., "BGP/MPLS IP Virtual Private Networks (VPNs)," RFC 4364, Network Working Group, Feb. 2006, 44 pp.

Behringer, M., "Analysis of the Security of BGP/MPLS IP Virtual Private Networks (VPNs)," RFC 4381, Network Working Group, Feb. 2006, 21 pp.

Response to European Search Report and Opinion in European Patent Application No. 16190810.8, dated Feb. 9, 2017, filed Oct. 2, 2017, 16 pp.

* cited by examiner

SECURING INTER-AUTONOMOUS SYSTEM LINKS

TECHNICAL FIELD

This disclosure relates to computer networks and, more particularly, to tunneling of network-based traffic.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, which in turn may be geographically distributed over a wide area. Each site network may include one or more local area networks (LANs). With the advent of Virtual Private Network (VPN) technology, enterprises can now securely share data between site networks over a public network, such as the Internet. In a typically implementation, one or more "network tunnels" are engineered through the intermediate network to transport data and other network communications between the geographically distributed sites.

One form of a VPN is generally referred to as "MPLS VPN" in which Multi-Protocol Label Switching (MPLS) tunnels are used as a transport mechanism. MPLS is a mechanism used to engineer traffic patterns within Internet Protocol (IP) networks. By utilizing MPLS, a source device can request a path through a network to a destination device, i.e., a Label Switched Path (LSP), to carry MPLS packets from the source device to a destination device. Each router along an LSP allocates a label and propagates the label to the closest upstream router along the path for use in forwarding MPLS packets along the path. Routers along the path cooperatively perform MPLS operations to forward the MPLS packets along the established path.

An MPLS VPN combines the tunneling processes of MPLS with virtual routing and forwarding (VRF) and features of border gateway protocol (BGP) to create a VPN. When a VPN is established within a network, devices for the VPN each include VPN-specific VRF tables. Greater details regarding VPNs, specifically VPNs implemented using BGP and MPLS are discussed in E. Rosen and Y. Rekhter, "BGP/MPLS IP Virtual Private Networks (VPNs)," RFC 4364, February 2006, available at http://tools.ietf.org/html/rfc4364, and L. Andersson and T. Madsen, "Provider Provisioned Virtual Private Network (VPN) Terminology," RFC 4026, March 2005, available at tools.ietf.org/html/rfc4026, the entire contents of each of which are incorporated by reference in their respective entireties.

Other forms of tunneling may be used instead of or in conjunction with MPLS. For example, another commonly used tunneling protocol is the Generic Routing Encapsulation (GRE) protocol which is typically used to encapsulate packets within Internet Protocol (IP) tunnels, thereby creating a virtual point-to-point link between devices, such as routers.

RFC 4364 describes various scenarios in which two sites of a VPN are connected to different Autonomous Systems (ASs). For example, the two sites may be connected to different service providers (SPs). In such instances, RFC 4364 recognizes that provider edge (PE) routers associated with that VPN cannot maintain interior BGP (IBGP) connections with each other. Thus, RFC 4364 describes the use of exterior BGP (EBGP) to distribute VPN-IPv4 addresses and labeled VPN-IPv4 routes.

SUMMARY

In general, this disclosure describes techniques for securing inter-autonomous system (AS) links. For example, suppose that provider edge (PE) routers of a Multiprotocol Label Switching (MPLS) path (such as for a virtual private network (VPN)) are present in different ASs. In this case, autonomous system boundary routers (ASBRs) lie along the MPLS path at the edges of the different ASs. The ASBRs may exchange labeled routes (e.g., labeled VPN-IPv4 routes) using exterior border gateway protocol (EBGP). However, absent the techniques of this disclosure, advertisements of such labeled routes may be spoofed. This disclosure describes techniques by which the ASBRs may prevent spoofing of such labeled route advertisements. In particular, the ASBRs may instantiate forwarding tables for MPLS paths that store distributed labels. In this manner, upon receipt of a packet encapsulated by a label (which may correspond to a packet to be forwarded by the ASBR or a route advertisement), an ASBR may determine whether the label was previously distributed by the ASBR (e.g., by checking the forwarding table). Then, the ASBR may install the route (or forward the packet) only when the label was previously distributed.

In one example, a method is performed by an autonomous system boundary router (ASBR) device of a first autonomous system (AS). The ASBR device is between a first provider edge (PE) router of the first AS and a second PE router of a second, different AS. The first PE router and the second PE router form a Multiprotocol Label Switching (MPLS) path. The method includes receiving a packet via an interface of the ASBR device that is communicatively coupled to a routing device external to the first AS, determining that the packet is encapsulated by an MPLS label, selecting a forwarding table based on the interface by which the packet was received, and forwarding the packet according to forwarding information to which the forwarding table maps the MPLS label.

In another example, an autonomous system boundary router (ASBR) device is included in a first autonomous system (AS) and between a first provider edge (PE) router of the first AS and a second PE router of a second, different AS. The first PE router and the second PE router form a Multiprotocol Label Switching (MPLS) path. The ASBR device includes an interface communicatively coupled to a routing device external to the first AS and a memory configured to store a forwarding table associated with the interface. The ASBR device also includes one or more processing units configured to receive a packet via the interface, determine that the packet is encapsulated by an MPLS label, select a forwarding table based on the interface by which the packet was received, and forward the packet according to forwarding information to which the forwarding table maps the MPLS label.

In another example, a non-transitory computer-readable storage medium has stored thereon instructions to be executed by a processor of an autonomous system boundary router (ASBR) device of a first autonomous system (AS). The ASBR device is between a first provider edge (PE) router of the first AS and a second PE router of a second, different AS. The first PE router and the second PE router form a Multiprotocol Label Switching (MPLS) path. When executed, the instructions cause the processor of the ASBR device to receive a packet via an interface of the ASBR device that is communicatively coupled to a routing device external to the first AS, determine that the packet is encapsulated by an MPLS label, select a forwarding table based on the interface by which the packet was received, and forward the packet according to forwarding information to which the forwarding table maps the MPLS label.

In another example, a first autonomous system (AS) includes a first provider edge (PE) router that forms a Multiprotocol Label Switching (MPLS) path with a second PE routing device of a second, different AS and an autonomous system boundary router (ASBR) device between the first PE router and the second PE router. The ASBR device of the first AS includes an interface communicatively coupled to a routing device external to the first AS, a memory configured to store a forwarding table associated with the interface, and one or more processing units configured to receive a packet via the interface, determine that the packet is encapsulated by an MPLS label, select a forwarding table based on the interface by which the packet was received, and forward the packet according to forwarding information to which the forwarding table maps the MPLS label.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a flowchart illustrating an example method for determining how to process labeled data received from a device external to an AS.

DETAILED DESCRIPTION

Figure 1:
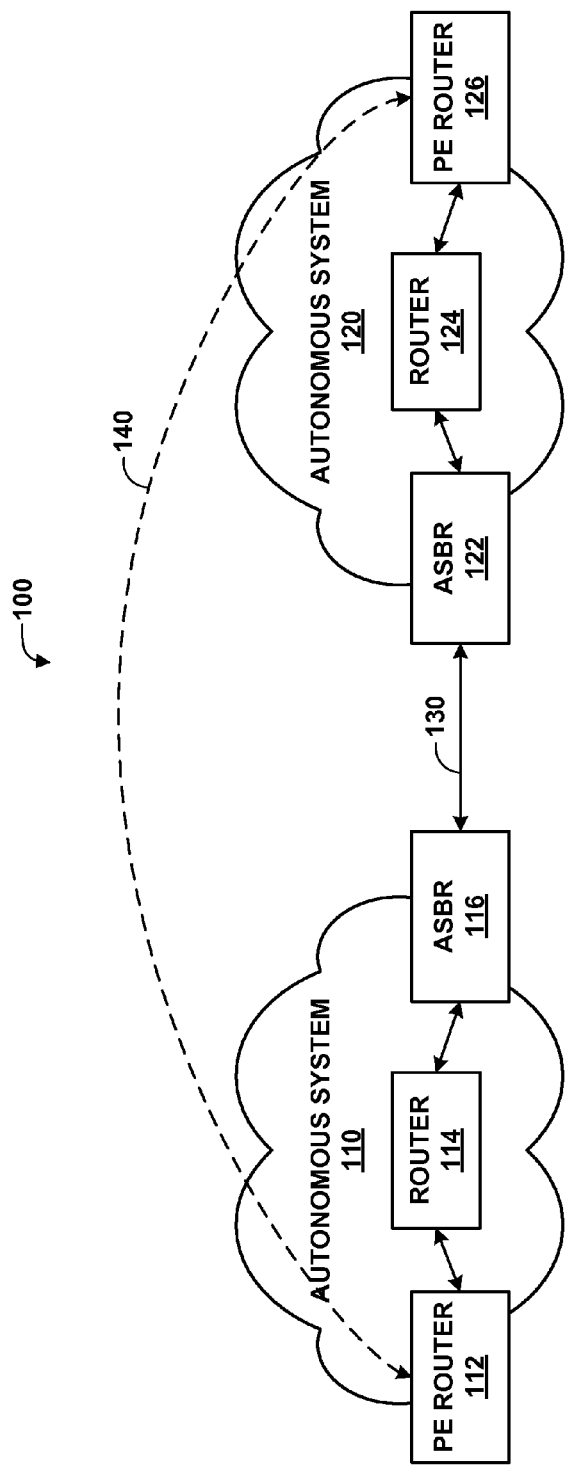
FIG. 1 is a block diagram illustrating an example network including two autonomous systems (ASs), including respective AS boundary routers (ASBRs).

FIG. 1 is a block diagram illustrating an example network 100 including two autonomous systems (ASs) 110, 120. AS 110 includes provider edge (PE) router 112, router 114, and autonomous system boundary router (ASBR) 116. AS 120 includes PE router 126, router 124, and ASBR 122. PE routers 112, 126 form a Multiprotocol Label Switching (MPLS) path 140 that includes, e.g., ASBRs 116, 122. That is, PE routers 112, 126 act as endpoints (e.g., ingress and egress points, respectively) for MPLS path 140.

ASBR 116 and ASBR 122 are communicatively coupled by link 130. Link 130 directly couples ASBR 116 and ASBR 122 in this example.

ASs 110, 120 may represent distinct service provider networks. That is, ASs 110, 120 may be operated by distinct entities for providing services. Services that may be provided by ASs 110, 120 include, for example, private network (VPN) services, Voice over IP (VoIP), access for Asynchronous Transfer Mode (ATM) or frame relay communications, Internet protocol (IP) data services, and multimedia distribution services, such as video streaming. Because ASs 110, 120 are separate, PE routers 112, 126 will not be able to maintain internal border gateway protocol (IBGP) connections with each other. Thus, PE routers 112, 126 (along with ASBRs 116, 122) may exchange routing information using techniques described in, e.g., RFC 4364, such as advertising labeled routes according to exterior BGP (EBGP) (described in RFC 4364 Section 10 Options B and C).

Because ASs 110, 120 represent distinct service provider networks, a service provided between ASs 110, 120 may be referred to as an inter-provider service. For example, ASs 110, 120 may provide an inter-provider MPLS path service, represented by MPLS path 140. In some examples, MPLS path 140 may represent a path for a VPN. Accordingly, ASs 110, 120 may provide an inter-provider MPLS VPN service.

One major issue with the inter-provider MPLS VPN service is data plane security, mainly label spoofing, when MPLS is enabled for an inter-provider link, such as link 130. One example of this inter-provider MPLS enabled VPN service model is defined by RFC 4364 section 10 options B and C. RFC 4364 section 13 adds requirement for data plane security to mitigate label spoofing. Behringer, "Analysis of the Security of BGP/MPLS IP Virtual Private Networks (VPNs)," Network Working Group, RFC 4381, February 2006, available at tools.ietf.org/html/rfc4381, sections 4.2 (b) and (c), analyzes the data plane security problem in detail.

The techniques of this disclosure can prevent data plane label spoofing, offering a solution to the issue discussed in RFC 4364 Section 13 for Option B. Anti-label spoofing is required for MPLS data traffic coming from an untrusted ASBR connected through an MPLS interface. For example, let ASBR 116 represent an ASBR device performing the techniques of this disclosure, and let ASBR 122 represent an untrusted ASBR connected to ASBR 116 via an MPLS interface. ASBR 116 may be directly coupled to ASBR 122. It is assumed that devices of autonomous system 110 (e.g., PE router 112 and router 114) are well protected against label spoofing. It is further assumed that ASBR 116 and ASBR 122 exchange labels using BGP (e.g., EBGP).

In general, ASBR 116 maintains a context specific label space in multiple MPLS label forwarding information bases (FIBs), also referred to as forwarding tables. The context may correspond to a network interface (e.g., a network interface card) connected to a device external to AS 110 (such as ASBR 122 or another router of link 130). ASBR 116 may therefore instantiate a new forwarding table (e.g., a routing information base (RIB)) corresponding to the network interface by which ASBR 116 is coupled to link 130. Furthermore, ASBR 116 includes data that associates the network interface to link 130 (an inter-provider link, in this example) with the new forwarding table.

ASBR 116 installs forwarding information in this new forwarding table according to protocols being executed with respect to link 130. ASBR 116 may maintain a routing table for inter-AS links, such as link 130. Similarly, ASBR 116 instantiates distinct forwarding tables for each inter-provider link (although only one such link, link 130, is shown in the example of FIG. 1). Separately, ASBR 116 maintains a routing table and a forwarding table for AS 110. With this approach, ASBR 116 installs labels advertised to core facing interfaces (also referred to as trusted interfaces) in the forwarding table for AS 110, and ASBR 116 installs labels advertised to inter-provider link interfaces in the respective forwarding tables.

By maintaining such different forwarding tables for different label domains, only inter-provider link advertised labels are installed in their respective forwarding tables. Thus, ASBR 116 may prevent label spoofing, because if a device coupled to one interface of ASBR 116 uses a label that was only advertised to a different interface of ASBR 116, ASBR 116 will determine that the label was not installed in the routing table of the interface by which the label was received. Thus, ASBR 116 may, e.g., drop packets encapsulated by labels that were not distributed on corresponding links by which the packets were received. ASBR 116 may thereby prevent label spoofing.

For example, suppose packets of MPLS path 140 are encapsulated by label L1. Suppose further that ASBR 116 is communicatively coupled to multiple different ASBRs including ASBR 122 (other ASBRs not shown in FIG. 1). Furthermore, ASBR 116 may store label L1 in a routing table and a forwarding table associated with link 130. Accordingly, ASBR 116 may distribute label L1 via an interface coupled to link 130, and ASBR 122 may advertise a labeled route using label L1 accordingly. In response, because label L1 was previously stored in the routing table associated with link 130, ASBR 116 may install the route in the routing table associated with link 130 when the route is labeled with label L1. Similarly, if ASBR 116 receives a packet encapsulated by label L1 via the interface coupled to link 130, ASBR 116 may determine that label L1 is present in the forwarding table associated with link 130, and thus, forward the packet according to the forwarding information of the forwarding table (e.g., to router 114).

However, assume that ASBR 116 receives a packet labeled with L1 via a different interface. ASBR 116 may determine whether L1 is present in a forwarding table associated with the different interface. Since L1 is associated with link 130 (per the discussion above), ASBR 116 may determine that L1 is not present in the forwarding table associated with the different interface. Accordingly, ASBR 116 may drop the packet, thereby preventing label spoofing. This assumes that label L1 was not previously and separately distributed via the different interface; labels need not be unique between different label spaces.

In this manner, routing and forwarding information for untrusted peers of ASBR 116 (that is, network devices that are not included in AS 110) may be isolated from routing and forwarding information of trusted peers (that is, other network devices of AS 110, such as PE router 112 and router 114). Thus, ASBR 116 may maintain separate routing and forwarding tables for MPLS families, populated only with labels exchanged with peers of a corresponding routing instance. The instance-specific tables also provide a separate routing domain, which may provide security similar to a firewall for IP traffic.

Figure 2:
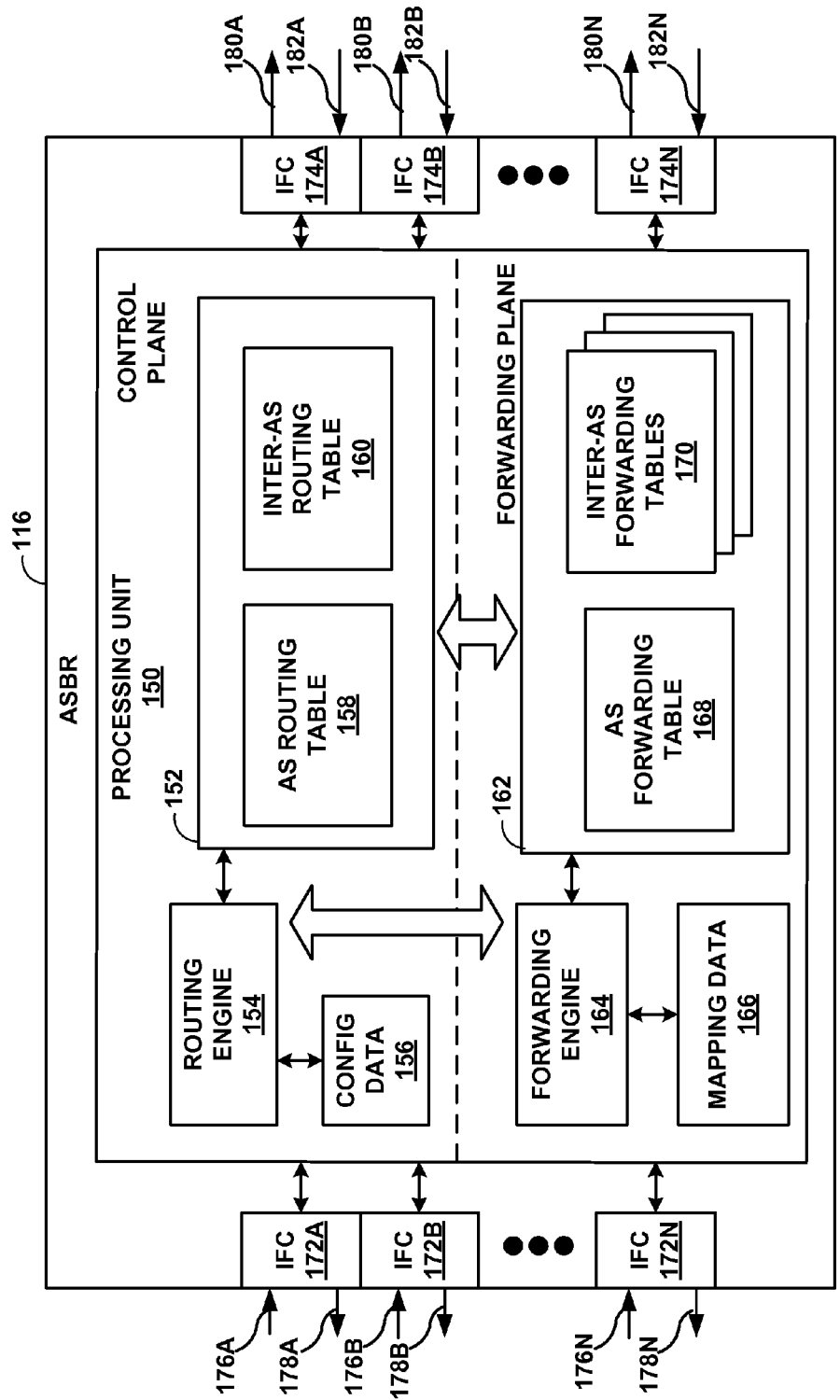
FIG. 2 is a block diagram illustrating an example arrangement of components of an ASBR.

FIG. 2 is a block diagram illustrating an example arrangement of components of ASBR 116 of FIG. 1. ASBR 122 may include similar components. In the example of FIG. 2, ASBR 116 includes inter-provider-link-facing interface cards 174A-174N (inter-provider-link facing IFCs 174) for communicating packets via inbound links 182A-182N ("inbound links 182") and outbound links 180A-180N ("outbound links 180") and core-facing interface cards 172A-172N ("core-facing IFCs 172") for communicating packets via outbound links 178A-178N ("outbound links 178") and inbound links 176A-176N ("inbound links 176"). Core-facing IFCs 172 are coupled to outbound links 178 and inbound links 176, and inter-provider-link facing IFCs 174 are coupled to inbound links 182 and outbound links 180, via a number of interface ports (not shown). Each of core-facing IFCs 172 are coupled to a respective network device of AS 110, while each of inter-provider-link facing IFCs 174 are coupled to a respective customer edge network device, any or all of which may belong to distinct customers, or other network devices external to AS 110. It should be understood that the letter "N" is used to represent an arbitrary number of devices, and moreover, that the number of IFCs 174 is not necessarily equal to the number of IFCs 172, although the cardinality for both IFCs 172 and IFCs 174 is designated using the variable "N."

ASBR 116 also includes processing unit 150. Processing unit 150 includes forwarding engine 164, forwarding information base (FIB) 162, routing engine 154, and routing information base (RIB) 152. Forwarding information base 162 includes AS forwarding table 168 and inter-AS forwarding tables 170, while routing information base 152 includes AS routing table 158 and inter-AS routing table 160. A default routing instance corresponds to AS routing table 158 and AS forwarding table 168. Inter-AS forwarding tables 170 form forwarding instances for inter-AS links, e.g., corresponding to respective ones of IFCs 174.

Processing unit 150 may be implemented in hardware, software, firmware, or any combination thereof. In one example, instructions for forwarding engine 164 are encoded in a computer-readable storage medium and are executed by a processor of processing unit 150. In other examples, forwarding engine 164 corresponds to a discrete hardware unit, such as a digital signal processor (DSPs), application specific integrated circuit (ASICs), field programmable gate array (FPGAs), or any other equivalent integrated or discrete logic circuitry or combination thereof. Similarly, routing engine 154 comprises any combination of hardware, software, and/or firmware that executes one or more routing protocols to determine routes through a network. Routing engine 154 stores learned and calculated routes in RIB 152, where customer routes for the different VPNs provided by ASBR 116 are stored in inter-AS routing table 160 for generation of VPN-specific forwarding information within each of inter-AS forwarding tables 170. AS forwarding table 168 associates tunnels to devices of links to a separate AS, such as link 130, with one of core-facing IFCs 172. In this way, different routing instances are used to logically isolate the routing and forwarding information for different VPNs.

Processing unit 150 also stores configuration (config) data 156 and mapping data 166. Configuration data 156 is typically provided by an administrator to define the configuration data for ASBR 116, including specifying IFCs 172, 174. In addition, ASBR 116 may generate configuration data 156 to define whether AS routing table 158 or inter-AS routing tables 160 corresponds to each of IFCs 172, 174. Similarly, mapping data 166 includes data defining correspondences between AS routing table 158, AS forwarding table 168, inter-AS routing table 160, inter-AS forwarding tables 170, and core-facing IFCs 172 and inter-provider-link facing IFCs 174.

In general, when ASBR 116 receives a packet via one of IFCs 174, e.g., IFC 174A, IFC 174A passes the packet to forwarding engine 164. Forwarding engine 164 inspects the packet to determine a destination of the packet, e.g., based on header information of the packet that includes an Internet protocol (IP) address of the destination or a label used to encapsulate the packet or a label used to encapsulate the packet.

In accordance with the techniques of this disclosure, AS routing table 158 and AS forwarding table 168 are associated with core-facing IFCs 172. That is, processing unit 150 utilizes routing information of AS routing table 158 and forwarding information of AS forwarding table 168 for packets received via each of IFCs 172. In other words, processing unit 150 maintains a single routing table and a single forwarding table for core-facing IFCs 172. However, each of inter-provider-link facing IFCs 174 is associated with inter-AS routing table 160 and a respective one of inter-AS forwarding tables 170. In this manner, when ASBR 116 receives a packet via one of inter-provider-link facing IFCs 174, processing unit 150 uses the one of inter-provider-link facing IFCs 174 by which the packet was received as a context for selecting one of inter-AS forwarding tables 170.

For example, if ASBR 116 receives a labeled route advertisement via inter-provider-link facing IFC 174A (e.g., that specifies ASBR 116 as its destination), routing engine 154 may determine whether a label of the labeled route advertisement was previously distributed via inter-provider-link facing IFC 174A. That is, routing engine 154 may select inter-AS routing table 160 associated with inter-provider-link facing IFC 174A (as indicated by configuration data 156), and determine whether the label is stored in the selected one of inter-AS forwarding tables 170. If the label is stored in the selected one of inter-AS forwarding tables 170, forwarding engine 164 may forward the packet to routing engine 154, which installs the route from the labeled route advertisement into inter-AS routing table 160 and then programs forwarding information of a corresponding one of inter-AS forwarding tables 170 (i.e., the one of inter-AS forwarding tables that is associated with IFC 174A). However, if the label is not stored in the selected one of inter-AS forwarding tables 170, forwarding engine 164 may discard the labeled route advertisement.

Likewise, when ASBR 116 receives a packet via one of inter-provider-link facing IFCs 174 that is to be forwarded (e.g., that specifies a destination other than ASBR 116), forwarding engine 164 may determine one of inter-AS forwarding tables 170 to which the one of inter-provider-link facing IFCs 174 corresponds (e.g., based on mapping data 166). As with a labeled route advertisement, forwarding engine 164 may determine one of inter-provider-link facing IFCs 174 from which a labeled packet is received, and use this as context for selecting one of inter-AS forwarding tables 170 in which to perform a lookup for forwarding the packet. Furthermore, forwarding engine 164 may determine whether a label used to encapsulate the packet is present in inter-AS forwarding tables 170. If the label is present, forwarding engine 164 forwards the packet via one of IFCs 172 to which forwarding information of the selected one of inter-AS forwarding tables 170 maps the label (or other information of the packet, e.g., a different label of a label stack of the packet or a destination IP address specified in header information of the packet). However, if the label is not present in the selected one of inter-AS forwarding tables 170, forwarding engine 164 may drop the packet.

In this manner, ASBR 116 represents an example of an ASBR of a first AS (AS 110) between a first PE router (PE router 112) of the first AS and a second PE router (PE router 126) of a second, different AS (AS 120), where the first PE router and the second PE router form an MPLS path (MPLS path 140). Furthermore, ASBR 116 in this example includes an interface communicatively coupled to a routing device external to the first AS (e.g., inter-provider-link facing IFCs 174), a memory configured to store a forwarding table associated with the interface (e.g., inter-AS forwarding tables 170), and one or more processing units (e.g., processing unit 150) configured to receive a packet via the interface, determine that the packet is encapsulated by an MPLS label, select a forwarding table based on the interface by which the packet was received, and forward the packet according to forwarding information to which the forwarding table maps the MPLS label.

Figure 3:
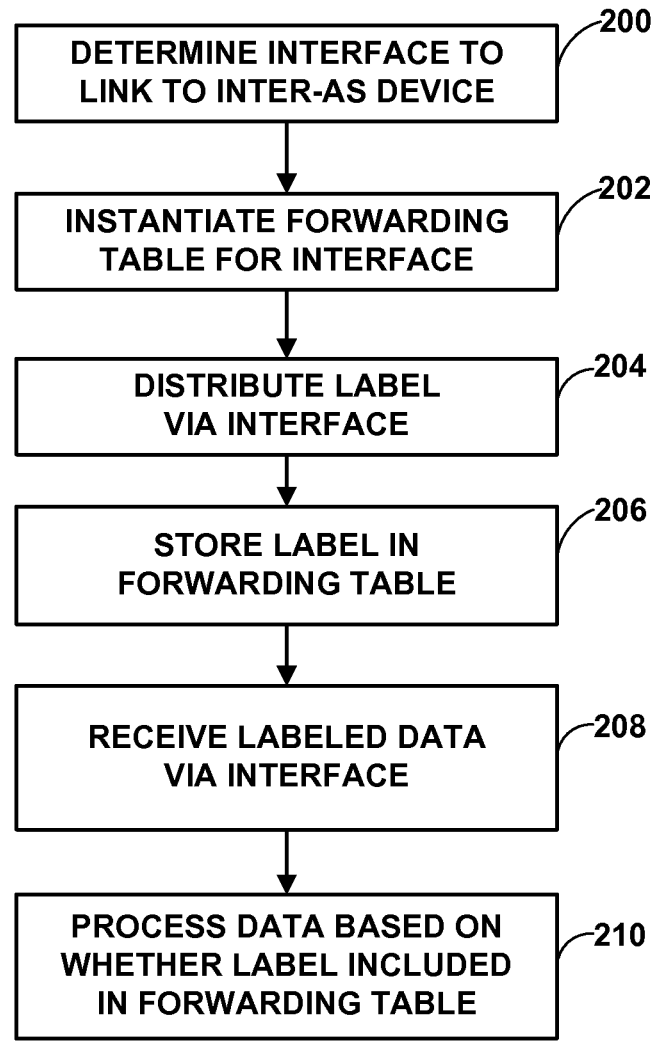

FIG. 3 is a flowchart illustrating an example method for determining how to process labeled data received from a device external to an AS. The method of FIG. 3 may be performed by, for example, ASBR 116 or ASBR 122. For purposes of explanation, the method of FIG. 3 is explained with respect to ASBR 116.

Initially, ASBR 116 may determine that an interface (e.g., one of IFCs 174) is communicatively coupled to a link to an inter-AS device (200). For example, ASBR 116 may be configured with information by an administrator that indicates that the interface is communicatively coupled to a device external to AS 110. The interface may be coupled to a link, such as link 130, that ultimately reaches a separate AS, such as AS 120.

In response to the determination, ASBR 116 may instantiate a forwarding table for the interface (202). In examples where interfaces are coupled to devices of AS 110 (i.e., the same AS that ASBR 116 is included in), ASBR 116 may use a common forwarding table for storing forwarding information of the interfaces. However, in the example of FIG. 3, because the interface is communicatively coupled to a device external to AS 110, ASBR 116 instantiates a separate forwarding table, e.g., one of inter-AS forwarding tables 170.

ASBR 116 also distributes a label via the interface (204). ASBR 116 also stores the label in the forwarding table (206), i.e., the forwarding table that was instantiated for the interface by which the label was distributed. Moreover, ASBR 116 may distribute multiple labels via the interface, and store each of the labels in the forwarding table (and may also store the labels in the routing table for the interface).

Subsequently, ASBR 116 may receive labeled data via the interface (208). That is, the data may be encapsulated by a label or otherwise include the label. The label need not necessarily be the same as the label distributed at step 204. Accordingly, ASBR 116 may process the data based on whether the label included with the data is included in the forwarding table (210). In particular, if the label included with the data is also included in the forwarding table, ASBR 116 may use the received data, whereas if the label is not included in the forwarding table, ASBR 116 may discard the data.

For example, if the received data is a labeled route advertisement, and the label is included in the forwarding table for the interface, ASBR 116 may install the route in the routing table instantiated for the interface. Alternatively, if the received data is a labeled packet (that is, a packet encapsulated by an MPLS label stack including the label), is destined for a separate device, and the label is included in the forwarding table for the interface, ASBR 116 may forward the packet according to forwarding information of the forwarding table instantiated for the interface by which the packet was received.

Figure 4:
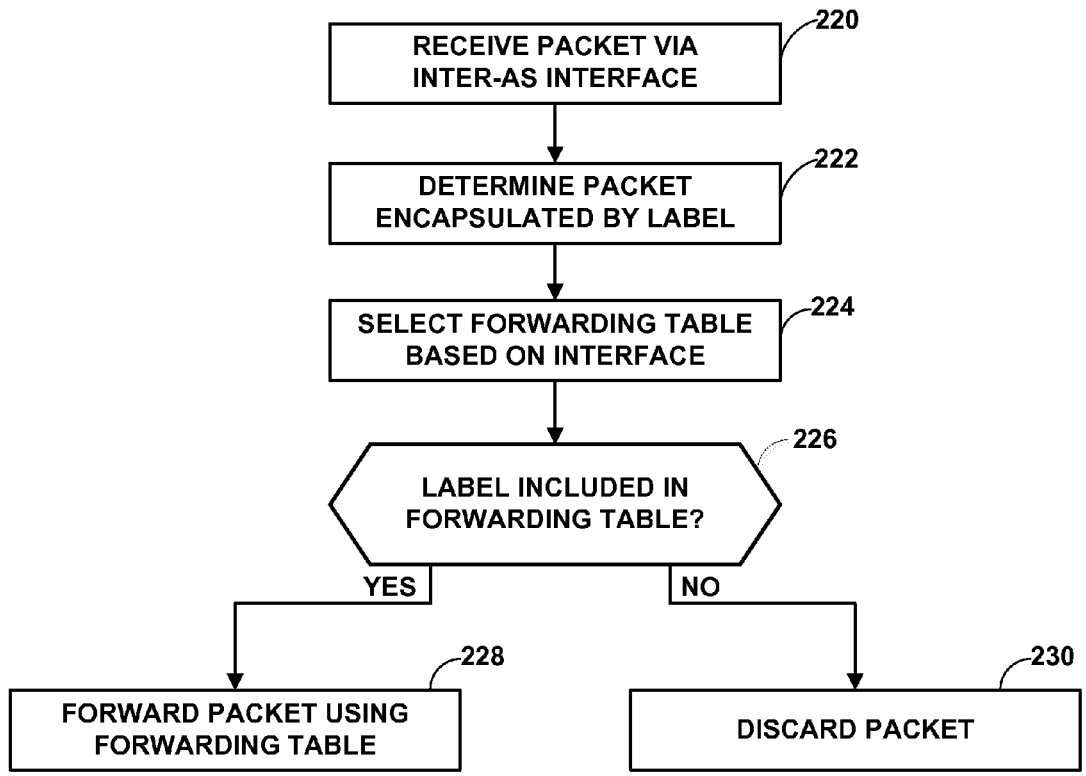
FIG. 4 is a flowchart illustrating another example method in accordance with the techniques of this disclosure.

FIG. 4 is a flowchart illustrating another example method in accordance with the techniques of this disclosure. Again, for purposes of example, the method of FIG. 4 is explained with respect to ASBR 116, although ASBR 122 may perform a similar method.

In this example, ASBR 116 receives a packet via an inter-AS interface (220), such as one of inter-provider-link facing IFCs 174. The interface provides the packet to forwarding engine 164. Forwarding engine 164 determines that the packet is encapsulated by a label (222), such as an MPLS label stack including the label. For example, forwarding engine 164 may process a header of the packet and determine that there is an MPLS header between an Ethernet header and an IP header of the packet. That is, data of the Ethernet header may specify an Ethertype value that indicates that the packet includes an MPLS header.

Forwarding engine 164 selects a forwarding table based on the interface by which the packet was received (224). That is, forwarding engine 164 selects the forwarding table (one of inter-AS forwarding tables 170) that is associated with the interface. Accordingly, forwarding engine 164 determines whether the label used to encapsulate the packet is included in the forwarding table (226). If the label is included in the forwarding table ("YES" branch of 226), forwarding engine 164 forwards the packet using data of the forwarding table (228). For example, the forwarding table may map a destination of the packet (which may be specified by the label, another label of the MPLS label stack, an IP header of the packet, or other information) to one of core-facing IFCs 172. However, if the label is not included in the forwarding table ("NO" branch of 226), forwarding engine 164 may discard the packet (230).

In this manner, the method of FIG. 4 may be performed by an ASBR device (e.g., ASBR 116) of a first AS (e.g., AS 110), where the ASBR device is between a first PE router (e.g., PE router 112) of the first AS and a second PE router (e.g., PE router 126) of a second, different AS (e.g., AS 120), and where the first PE router and the second PE router form an MPLS path (e.g., MPLS path 140). The method of FIG. 4 also represents an example of a method including receiving a packet via an interface of the ASBR device that is communicatively coupled to a routing device external to the first AS, determining that the packet is encapsulated by an MPLS label, selecting a forwarding table based on the interface by which the packet was received, and forwarding the packet according to forwarding information of the forwarding table when the forwarding table includes the MPLS label.

Although the method of FIG. 4 represents an example of a packet to be forwarded by ASBR 116, in other examples, a packet may be destined for ASBR 116 itself. For example, the packet may specify ASBR 116 as its destination, and include a labeled route advertisement. In some examples, ASBR 116 may process such a packet in substantially the same way, e.g., determining whether the label is included in the forwarding table. However, rather than forwarding the packet via one of core-facing IFCs 172, forwarding engine 164 may forward the packet to routing engine 154 after determining whether a label of the packet was distributed via the interface from which the packet was received.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising, by an autonomous system boundary router (ASBR) device of a first autonomous system (AS), wherein the ASBR device is between a first provider edge (PE) router of the first AS and a second PE router of a second, different AS, and wherein the first PE router and the second PE router form a Multiprotocol Label Switching (MPLS) path:
   receiving a first packet via an inter-AS interface of the ASBR device that is communicatively coupled to a routing device external to the first AS;
   determining that the first packet is encapsulated by an MPLS label;
   selecting an inter-AS forwarding table based on the inter-AS interface by which the first packet was received;
   forwarding the first packet according to forwarding information of the inter-AS forwarding table when the inter-AS forwarding table includes the MPLS label;
   receiving a second packet via an intra-AS interface of the ASBR device that is communicatively coupled to a routing device internal to the first AS;
   selecting an intra-AS forwarding table based on the intra-AS interface by which the second packet was received, wherein the intra-AS forwarding table is associated with a plurality of interfaces of the ASBR device that are each coupled to routing devices internal to the first AS; and
   forwarding the second packet according to forwarding information of the intra-AS forwarding table.

2. The method of claim 1, further comprising, prior to receiving the first packet, instantiating the inter-AS forwarding table and associating the inter-AS forwarding table with the inter-AS interface.

3. The method of claim 1, wherein the MPLS label comprises a first MPLS label, the method further comprising:
receiving a third packet via the inter-AS interface;
determining that the third packet is encapsulated by a second MPLS label; and
in response to determining that the second MPLS label is not included in the inter-AS forwarding table, dropping the third packet.

4. The method of claim 1, wherein the MPLS path is associated with a virtual private network (VPN).

5. The method of claim 1, wherein the inter-AS interface comprises a first inter-AS interface of a plurality of inter-AS interfaces, wherein the inter-AS forwarding table comprises a first inter-AS forwarding table, and wherein the MPLS path comprises a first MPLS path of a plurality of MPLS paths, each of the plurality of MPLS paths being associated with a corresponding one of the plurality of inter-AS interfaces, the method further comprising maintaining a plurality of inter-AS forwarding tables each associated with a corresponding one of the plurality of inter-AS interfaces.

6. An autonomous system boundary router (ASBR) device of a first autonomous system (AS), wherein the ASBR device is between a first provider edge (PE) router of the first AS and a second PE router of a second, different AS, and wherein the first PE router and the second PE router form a Multiprotocol Label Switching (MPLS) path, the ASBR device comprising:
an inter-AS interface communicatively coupled to a routing device external to the first AS;
a plurality of intra-AS interfaces communicatively coupled to respective routing devices internal to the first AS;
one or more memories configured to store an inter-AS forwarding table associated with the inter-AS interface and an intra-AS forwarding table associated with each of the plurality of intra-AS interfaces; and
one or more processing units implemented in circuitry and configured to:
receive a first packet via the inter-AS interface;
determine that the first packet is encapsulated by an MPLS label;
select the inter-AS forwarding table based on the inter-AS interface by which the first packet was received;
forward the first packet according to forwarding information of the inter-AS forwarding table when the inter-AS forwarding table includes the MPLS label;
receive a second packet via an intra-AS interface of the plurality of intra-AS interfaces;
select the intra-AS forwarding table based on the intra-AS interface by which the second packet was received; and
forward the second packet according to forwarding information of the intra-AS forwarding table.

7. The ASBR device of claim 6, wherein the one or more processing units comprise a forwarding engine.

8. The ASBR device of claim 6, wherein the one or more processing units are configured to instantiate the inter-AS forwarding table and associate the inter-AS forwarding table with the inter-AS interface prior to receiving the first packet.

9. The ASBR device of claim 6, wherein the MPLS label comprises a first MPLS label, and wherein the one or more processing units are further configured to:
receive a third packet via the interface;
determine that the second packet is encapsulated by a second MPLS label; and
in response to determining that the second MPLS label is not included in the inter-AS forwarding table, drop the third packet.

10. The ASBR device of claim 6, wherein the MPLS path is associated with a virtual private network (VPN).

11. The ASBR device of claim 6, wherein the inter-AS interface comprises a first inter-AS interface of a plurality of inter-AS interfaces, wherein the inter-AS forwarding table comprises a first inter-AS forwarding table, wherein the MPLS path comprises a first MPLS path of a plurality of MPLS paths, each of the plurality of MPLS paths being associated with a corresponding one of the plurality of inter-AS interfaces, wherein the memory is further configured to store a plurality of inter-AS forwarding tables, including the first inter-AS forwarding table, and wherein each of the plurality of inter-AS forwarding tables is associated with a corresponding one of the plurality of inter-AS interfaces.

12. A non-transitory computer-readable storage medium comprising instructions that, when executed, cause a processor of an autonomous system boundary router (ASBR) device of a first autonomous system (AS), wherein the ASBR device is between a first provider edge (PE) router of the first AS and a second PE router of a second, different AS, and wherein the first PE router and the second PE router form a Multiprotocol Label Switching (MPLS) path, to:
receive a first packet via an inter-AS interface of the ASBR device that is communicatively coupled to a routing device external to the first AS;
determine that the first packet is encapsulated by an MPLS label;
select an inter-AS forwarding table based on the inter-AS interface by which the first packet was received;
forward the first packet according to forwarding information of the inter-AS forwarding table when the inter-AS forwarding table includes the MPLS label;
receive a second packet via an intra-AS interface of the ASBR device that is communicatively coupled to a routing device internal to the first AS;
select an intra-AS forwarding table based on the interface by which the second packet was received, wherein the intra-AS forwarding table is associated with a plurality of interfaces of the ASBR device that are each coupled to routing devices internal to the first AS; and
forward the second packet according to forwarding information of the intra-AS forwarding table.

13. The non-transitory computer-readable storage medium of claim 12, further comprising instructions that cause the processor to, prior to receiving the first packet, instantiate the inter-AS forwarding table and associate the inter-AS forwarding table with the inter-AS interface.

14. The non-transitory computer-readable storage medium of claim 12, wherein the MPLS label comprises a first MPLS label, further comprising instructions that cause the processor to:
receive a third packet via the inter-AS interface;
determine that the third packet is encapsulated by a second MPLS label; and
in response to determining that the second MPLS label is not included in the inter-AS forwarding table, drop the third packet.

15. The non-transitory computer-readable storage medium of claim 12, wherein the MPLS path is associated with a virtual private network (VPN).

16. The non-transitory computer-readable storage medium of claim 12, wherein the inter-AS interface comprises a first inter-AS interface of a plurality of inter-AS interfaces, wherein the inter-AS forwarding table comprises a first inter-AS forwarding table, and wherein the MPLS path comprises a first MPLS path of a plurality of MPLS paths, each of the plurality of MPLS paths being associated with a corresponding one of the plurality of inter-AS interfaces, further comprising instructions that cause the processor to maintain a plurality of inter-AS forwarding tables each associated with a corresponding one of the plurality of inter-AS interfaces.

17. A first autonomous system (AS) comprising:
a first provider edge (PE) router that forms a Multiprotocol Label Switching (MPLS) path with a second PE routing device of a second, different AS;
a plurality of routing devices separate from the PE router; and
an autonomous system boundary router (ASBR) device between the first PE router and the second PE router and separate from the plurality of routing devices, the ASBR device comprising:
an inter-AS interface communicatively coupled to a routing device external to the first AS;
a plurality of intra-AS interfaces communicatively coupled to respective routing devices of the plurality of routing devices;
one or more memories configured to store an inter-AS forwarding table associated with the inter-AS interface and an intra-AS forwarding table associated with each of the plurality of intra-AS interfaces; and
one or more processing units implemented in circuitry and configured to:
receive a first packet via the inter-AS interface;
determine that the first packet is encapsulated by an MPLS label;
select the inter-AS forwarding table based on the inter-AS interface by which the first packet was received;
forward the first packet according to forwarding information of the inter-AS forwarding table when the inter-AS forwarding table includes the MPLS label;
receive a second packet via an intra-AS interface of the plurality of intra-AS interfaces;
select the intra-AS forwarding table based on the intra-AS interface by which the second packet was received; and
forward the second packet according to forwarding information of the intra-AS forwarding table.

18. The first autonomous system of claim 17, wherein the one or more processing units of the ASBR device comprise a forwarding engine.

19. The first autonomous system of claim 17, wherein the one or more processing units of the ASBR device are configured to instantiate the inter-AS forwarding table and associate the inter-AS forwarding table with the inter-AS interface prior to receiving the first packet.

20. The first autonomous system of claim 17, wherein the MPLS label comprises a first MPLS label, and wherein the one or more processing units of the ASBR device are further configured to:
receive a third packet via the inter-AS interface;
determine that the third packet is encapsulated by a second MPLS label; and
in response to determining that the second MPLS label is not included in the inter-AS forwarding table, drop the third packet.

21. The first autonomous system of claim 17, wherein the MPLS path is associated with a virtual private network (VPN).

22. The first autonomous system of claim 17, wherein the inter-AS interface of the ASBR device comprises a first inter-AS interface of a plurality of inter-AS interfaces of the ASBR device, wherein the inter-AS forwarding table comprises a first inter-AS forwarding table of the ASBR device, wherein the MPLS path comprises a first MPLS path of a plurality of MPLS paths, each of the plurality of MPLS paths being associated with a corresponding one of the plurality of inter-AS interfaces of the ASBR device, wherein the memory of the ASBR device is further configured to store a plurality of inter-AS forwarding tables, including the first inter-AS forwarding table, and wherein each of the plurality of inter-AS forwarding tables is associated with a corresponding one of the plurality of inter-AS interfaces.

* * * * *